United States Patent
Heidari et al.

(10) Patent No.: US 7,035,326 B1
(45) Date of Patent: Apr. 25, 2006

(54) METHOD AND APPARATUS FOR INITIALIZING MODEM COMMUNICATIONS

(75) Inventors: Sam Heidari, Menlo Park, CA (US); Mazen M. Shihabi, Irvine, CA (US); Saman Behtash, Bergamo (IT); Hojat Khelghati, San Jose, CA (US); John Gevargiz, Manhattan Beach, CA (US); Avadhani Sridhar, Santa Clara, CA (US); Fernando Ramirez-Mireles, Walnut Creek, CA (US)

(73) Assignee: Ikanos Communication, Inc., Fremont, CA (US)

( * ) Notice: Subject to any disclaimer, the term of this patent is extended or adjusted under 35 U.S.C. 154(b) by 807 days.

(21) Appl. No.: 10/071,536

(22) Filed: Feb. 8, 2002

Related U.S. Application Data

(60) Provisional application No. 60/267,893, filed on Feb. 9, 2001.

(51) Int. Cl.
*H03H 7/40* (2006.01)
*H04B 1/38* (2006.01)

(52) U.S. Cl. .................................................. 375/229
(58) Field of Classification Search ................ 375/222, 375/220, 229, 231, 232
See application file for complete search history.

(56) References Cited

U.S. PATENT DOCUMENTS 6,483,553 B1 * 11/2002 Jung ........................... 348/731

OTHER PUBLICATIONS

Very-high bit-rate Digital Subscriber Lines (VDSL) Metallic Interface, Part 3: Technical Specification of a Multi-Carrier Modulation Transceiver Committee T1-Telecommunications, Working Group T1E1.4 (DSL Access) Vancouver, BC, Feb. 2001.

* cited by examiner

*Primary Examiner*—Kevin Kim
(74) *Attorney, Agent, or Firm*—IP Creators; Charles C Cary

(57) ABSTRACT

The present invention provides a method and apparatus for demodulating data received over a communication medium carrying a transmission having multiple pilot tones with pilot data modulated thereon and message tones with message data modulated thereon and with the pilot tones and message tones frequency division multiplexed with respect to one another. In an embodiment of the invention the communication protocol utilized for modulation and demodulation is discrete multi tone (DMT). The invention allows message processing and equalizer training to proceed in parallel before equalizer training tables have been completed thus reducing the time associated with modem initialization. The apparatus in one embodiment of the invention includes on the receive path of a DMT or other multi-tone modem, a fast Fourier transform engine (FFT), a message processor, and a decoder. The FFT converts the received data from a time domain to a frequency domain. The received data in the frequency domain includes successive sets of pilot tones together with message tones. The message processor selects pairs of message and pilot tones proximate to one another in the frequency domain in each set of pilot tones and message tones. The message tone in each pair is then equalized with the pilot tone in the pair to substantially remove frequency dependent phase shifts imparted by the communication medium to the message tone. The equalized message tone is then decoded in the decoder to the corresponding specific set of message data which it represents.

9 Claims, 9 Drawing Sheets

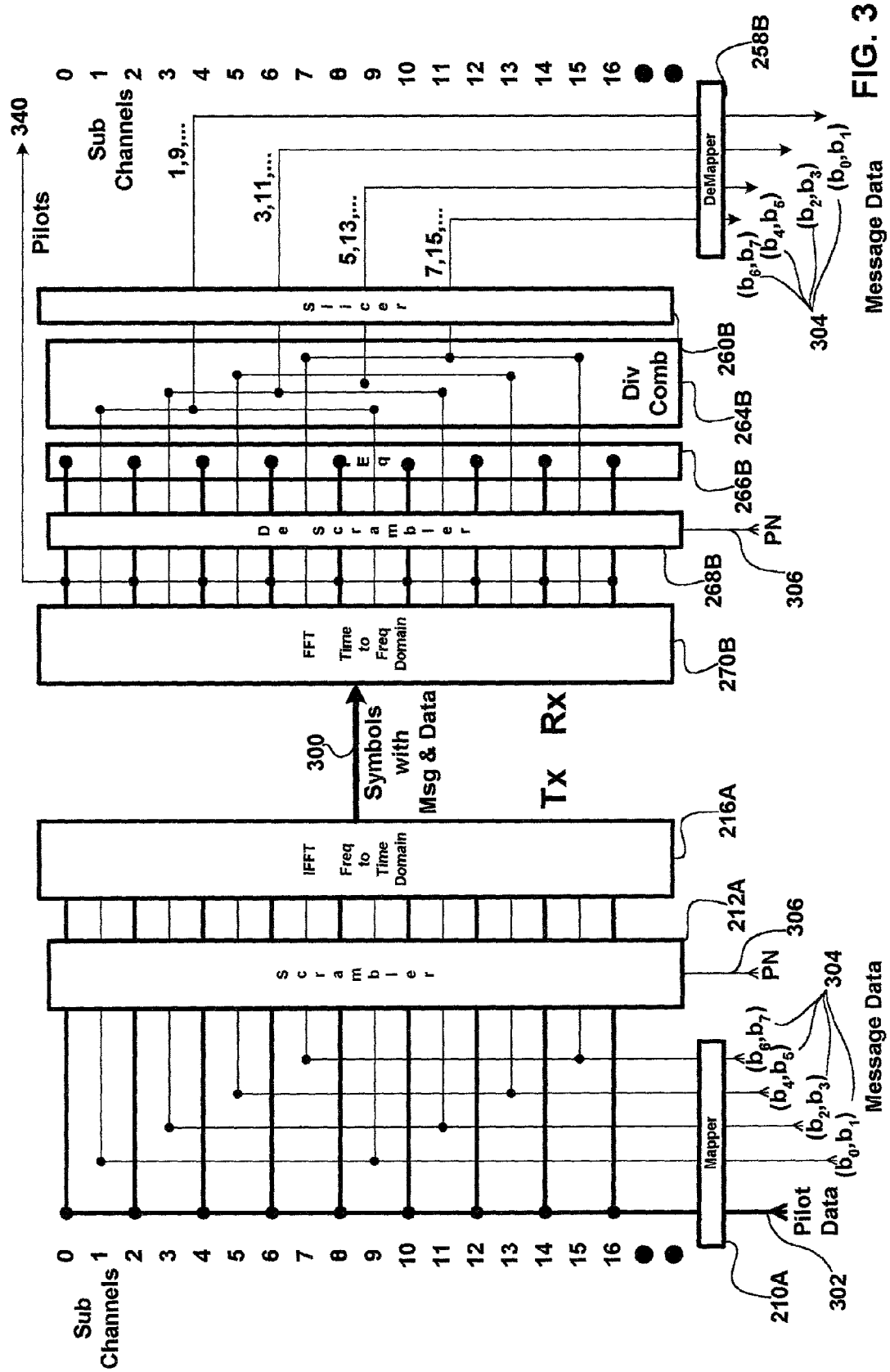

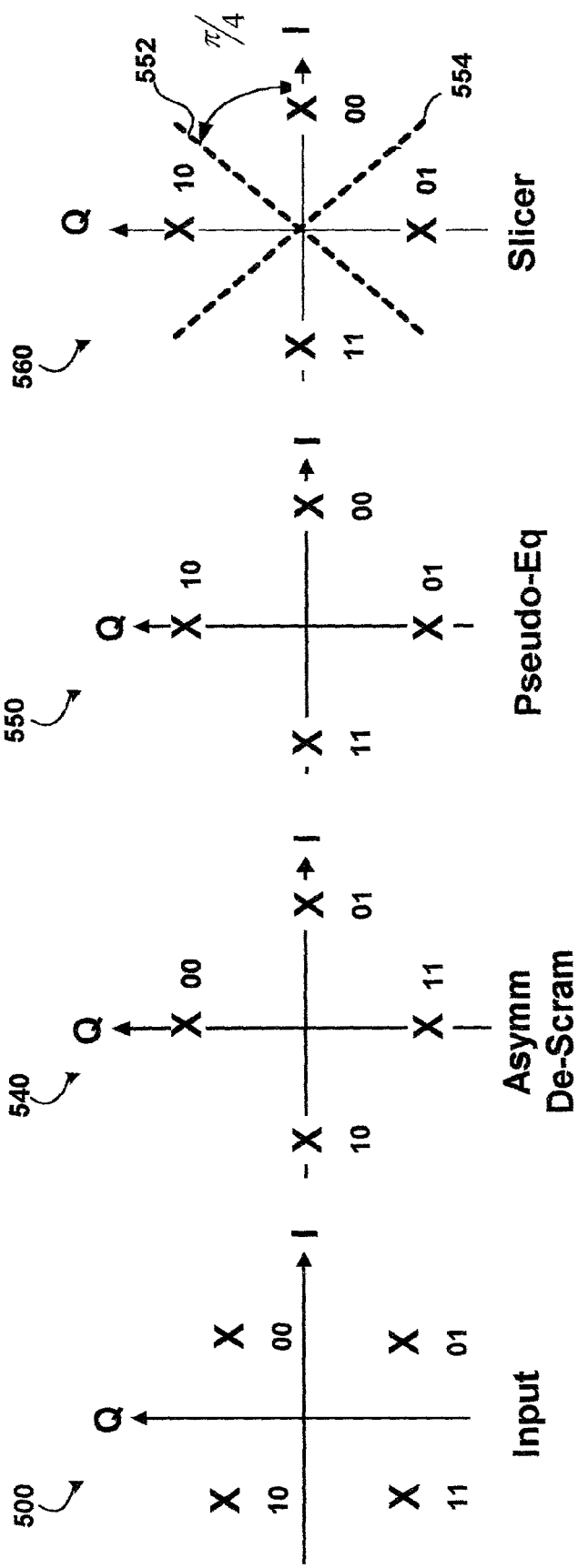

METHOD AND APPARATUS FOR INITIALIZING MODEM COMMUNICATIONS

CROSS REFERENCE TO RELATED APPLICATION

This application claims the benefit of prior filed co-pending Provisional Application No. 60/267,893 filed on Feb. 9, 2001 entitled "Initialization Mode Receiver" which is incorporated herein by reference in its entirety as if fully set forth herein.

BACKGROUND OF THE INVENTION

1. Field of Invention

The field of the present invention relates in general to modems and more particularly digital modems.

2. Description of the Related Art

Digital Subscriber Lines (DSL) technology and improvements thereon including: G.Lite, ADSL, VDSL, HDSL all of which are broadly identified as X-DSL have been developed to increase the effective bandwidth of existing subscriber line connections, without requiring the installation of new fiber optic cable. Subscriber lines were originally constructed to handle voice traffic in the narrow band between 300 Hz to 3000 Hz at bandwidths equivalent to several kilo baud. With X-DSL significant increases in bandwidth have been made possible by utilizing frequencies higher than the voice band to deliver services such as: data, video, audio etc. Thus an X-DSL modem may operate simultaneously with a voice band modem or a telephone conversation.

Currently there are over ten X-DSL standards, including: G.Lite, ADSL, VDSL, SDSL, MDSL, RADSL, HDSL, etc. Within each standard there may be more than one line code, or modulation protocol, e.g. discrete multi-tone (DMT) and carrier less AM/PM (CAP). DMT modulation involves establishing a communication channel with a plurality of sub-channels each with a center frequency a.k.a. carrier tone. The sub-channels are frequency division multiplexed across the available bandwidth. Each sub-channel uses quadrature phase amplitude modulation (QPAM) to modulate information. The center frequency, a.k.a. tone of each sub-channel serves as the carrier on which QPAM modulation of information is effected. The information modulated on a tone is identified in the frequency domain as a sub-symbol which defines a unique phase and amplitude relationship between the carrier tone and the information modulated on it. Each sub-symbol may be expressed as a complex number. Specific bits of information are converted to a corresponding complex number using a mapping table, which defines for all possible phase and amplitudes supported by the DMT protocol corresponding binary bits. Collectively all the sub-symbols modulated on each tone across a tone set are defined as a symbol, with the symbol rate defined by the corresponding X-DSL standard.

Typically initialization of an X-DSL modem utilizing a DMT modulation protocol, begins with several discrete phases of initialization including: handshake, training, channel analysis and showtime. The outcome of initialization is a contract between the modems on communication parameters which takes into account both modem capabilities and limitations in the quality of the communication medium linking the modems.

During the handshake phase each modem passes to the other basic identity information such as: inverse or discrete Fourier transform size and the initial length of the cyclic extension. This information is passed using a modulation protocol such as binary phase shift key (BPSK) with a single carrier. The use of BPSK allows information to be exchanged without using DMT modulation. The next and subsequent initialization phases utilize DMT modulation with various degrees of complexity up to the showtime phase at which the full transport capabilities of the modems and the subscriber line by which they are coupled have been trained.

The training phase involves setting gains, synchronizing clocks, synchronizing of symbol boundaries, and determination of weights associated with time or frequency domain equalization and echo cancellation. All of these are accomplished with a fixed set of data, a.k.a. pilot tones, modulated on each sub-channel. The pilot tones and the manner in which they are modulated are known to both sending and receiving modems. The channel analysis phase follows the training phase.

During channel analysis each tone is modulated with varying amount of data in order to maximize the data carrying capability of the communication medium that links the modems. During this phase the modems pass parameters which allow each to establish a bit loading for each tone across a tone set. At the completion of the channel analysis and exchange the modems enter showtime state in which communication of voice, data, video, etc. across the communication medium begins.

The trend in X-DSL communication is toward integrating optical network units (ONU) and X-DSL modems to bridge the gap between the high speed backbone provided by the public switched telephone network (PSTN) and other long haul providers and the subscriber residence. The very high-speed digital subscriber line (V-DSL) offers short haul bandwidth approaching that achievable with ONU. This bandwidth is achieved by extending the upper limits of the frequency range at which the modem is required to operate. The combination of enhanced bandwidth, very low signal to noise ratios, and the bundling of subscriber lines results in initialization procedures for VDSL modems which are more complex than is the case for the lower bandwidth X-DSL standards such as ADSL.

VDSL modems require during the training phase of initialization an exchange of information other than pilot tones over the DMT link that they are setting up. VDSL draft trial standard document entitled *"Very-high bit-rate Digital Subscriber Lines (VDSL) Metallic Interface, Part 3: Technical Specifications of a Multi-Carrier Modulation Transceiver"* at Chapter 11, Link Activation and Deactivation pp. 36–58, T1E1.4/2000-013R2 promulgated by the Committee T1-Telecommunications, Working Group T1E1 (DSL Access) Vancouver, Canada, Aug. 14–18, 2000 sets forth such a standard. The draft standard calls for pilot tones interlaced with message tones to convey information between the modems which identify: bandwidth allocation, radio frequency interference (RFI) bands, transmit power spectral density (PSD) in the downstream and upstream directions, whether power back off (PBO) is performed using a maximum receive PSD or using an upstream PSD mask, the reference PSD, and the overall length of the window at the transmitter. The modems utilize this information to establish communication parameters for the training and subsequent phases of operation.

What is needed is a modem with improved capabilities for handling information transfer on a complex modulation protocol such as DMT during the training phase.

SUMMARY OF THE INVENTION

The present invention provides a method and apparatus for demodulating data received over a communication medium carrying a transmission having multiple pilot tones with pilot data modulated thereon and message tones with message data modulated thereon and with the pilot tones and message tones frequency division multiplexed with respect to one another. In an embodiment of the invention the communication protocol utilized for modulation and demodulation is discrete multi tone (DMT). The communication medium may be wired or wireless. The communication may be conducted between logical and or physical modems in any combination. The invention may be implemented in hardware, firmware or software. The invention allows message processing early in modem initialization before equalizer training tables have been completed. The invention allows message processing and equalizer training to proceed in parallel thus reducing the time associated with modem initialization. The invention may be applied with particular advantage to the training phase of modems implementing VDSL or other similar multi-tone communication protocols which include in the training or other phases of operation symbols with pilot and message data interlaced with one another.

The apparatus in one embodiment of the invention includes on the receive path of a DMT or other multi-tone modem, a fast Fourier transform engine (FFT), message processor, and a decoder. During a phase of modem operation where successive symbols of received data include message and pilot data the FFT converts the received data from a time domain to a frequency domain. The received data in the frequency domain includes successive sets of sub-symbols corresponding with the information modulated on the pilot tones and message tones. The message processor selects pairs of sub-symbols with each pair corresponding with a message tone and a pilot tone proximate in frequency to one another. The message sub-symbol in each pair is then equalized with the pilot sub-symbol in the pair to substantially remove frequency dependent phase shifts imparted by the communication medium to the message tone. The equalized message sub-symbol is then decoded in the decoder to the corresponding specific set of message data which it represents.

In alternate embodiments of the invention training of a frequency domain equalizer may be accomplished in parallel with the message processing performed by the pseudo-equalizer and de-mapper.

BRIEF DESCRIPTION OF THE DRAWINGS

These and other features and advantages of the present invention will become more apparent to those skilled in the art from the following detailed description in conjunction with the appended drawings in which:

FIG. 3 is a detailed hardware block diagram of a portion of the transmit and receive path of the pair of modems shown in FIGS. 2A–B during the training phase of initialization.

FIGS. 6A–D are graphs showing the constellations utilized in the training phase and the de-scrambling and slicing thereof in the embodiment of the invention shown in FIG. 5.

DETAILED DESCRIPTION OF THE EMBODIMENTS

Figure 1:
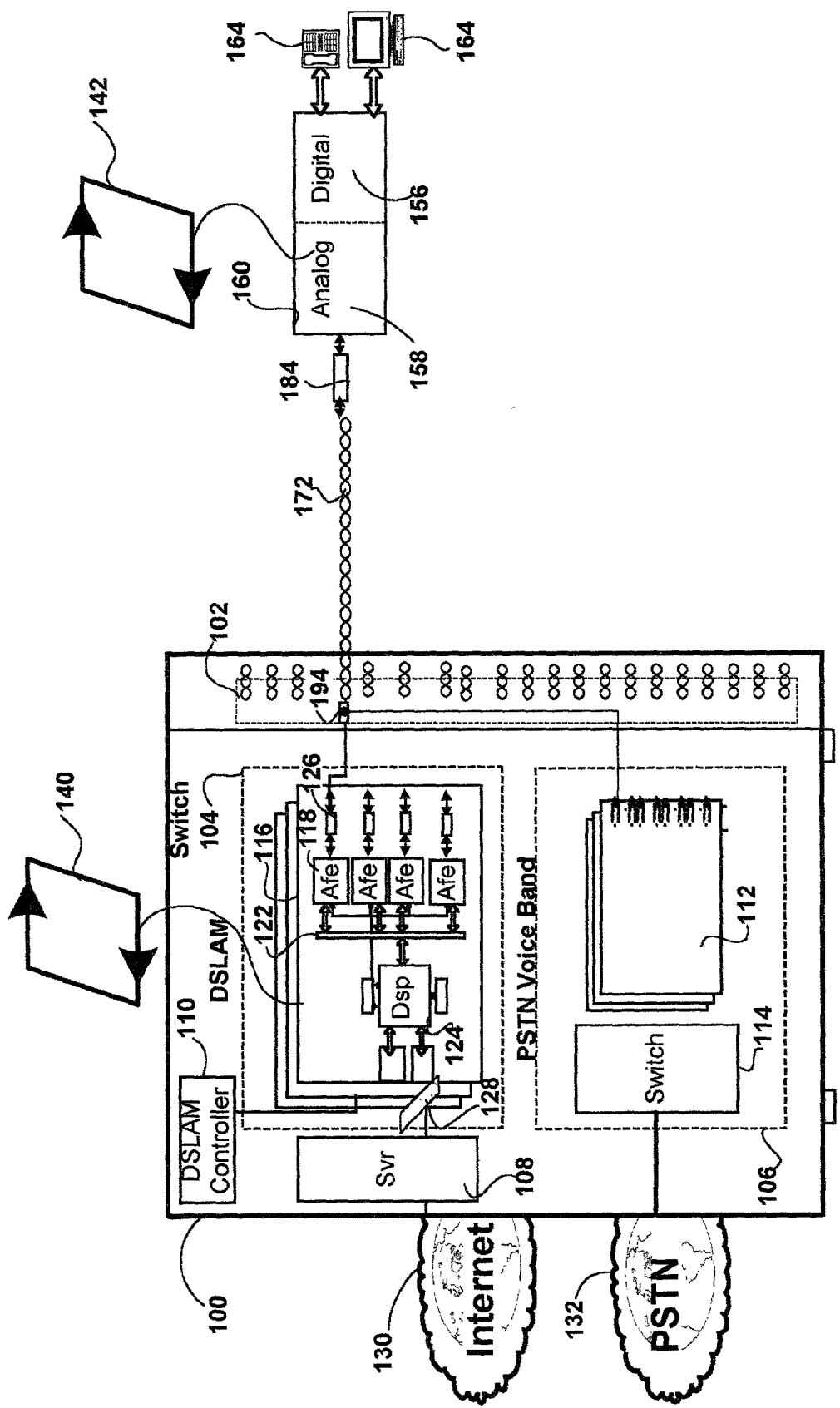
FIG. 1 shows a communication system with a logical modem at a central office (CO) coupled over a subscriber line to a physical modem at a customer's premises.

FIG. 1 shows a communication system with a logical modem at a central office (CO) coupled over a subscriber line to a physical modem at a customer's premises. The system includes the CO 100 coupled across a subscriber line 172 with a physical modem 160 positioned at a customer's premises.

All subscriber lines handled by the CO originate in the frame room 102 of the CO. From this room connections are made for each subscriber line via splitters and hybrids to both a digital subscriber line access module (DSLAM) 104 and to the voice band racks 106. The splitter 194 shunts voice band communications to dedicated line cards, e.g. line card 112 or to a voice band modem pool (not shown). The splitter shunts higher frequency X-DSL communications on the subscriber line to a selected line card, e.g. line card 116, within DSLAM 104. Voice band call set up is controlled by a Telco switch matrix 114 such as SS7. This makes point-to-point connections to other subscribers for voice band communications across the public switched telephone network 132. The X-DSL communications may be processed by a universal line card such as line card 116. That line card implements a plurality of logical modems via a digital signal processor (DSP) 124 coupled across a packet bus 122 with a number of analog front ends (AFE) of which AFE 118 is referenced. Each AFE couples via a hybrid front end (HFE) with a corresponding one of the subscriber lines. AFE 118 couples via HFE 126 with subscriber line 172. For downstream communications from the CO to the remote site, the DSP modulates the data for each communication channel, the AFE transforms the digital symbol packets assembled by the DSP and converts them to an analog signal which is output on the subscriber line associated with the respective channel. For upstream communications from the remote site to the CO the AFE converts the communications to digitized data samples which are sent to the DSP where they are demodulated. The DSP may be capable of multi-protocol support for all subscriber lines to which the AFE's are coupled. Communication between AFE(s) and DSP(s) may be packet based. The line card 116 is coupled to a back-plane bus 128 which may be capable of offloading and transporting X-DSL traffic between other DSPs for load balancing. The back-plane bus of the DSLAM also couples each line card to the Internet 130 via server 108. Each of the DSLAM line cards operates under the control of a DSLAM controller 110 which handles global provisioning, e.g. allocation of subscriber lines to AFE and DSP resources. The various components on the line card form a plurality of logical modems each handling upstream and downstream communications across corresponding subscriber lines. When an X-DSL communication is established on a subscriber line, a specific channel identifier is allocated to that communication. That identifier may be used in the above mentioned packet based embodiment to track each packet as it moves in an upstream or downstream direction between the AFE and DSP.

At the customer premises a physical modem 160 is shown coupled via HFE 184 to subscriber line 172. That physical modem has an analog portion 158 and a digital portion 156. The physical modem couples voice band communications with the phone 164 and X-DSL band communications with the computer terminal 164. The logical modem on line card 116 and the physical modem 160 each perform training processes 140, 142 respectively during initialization of a communication channel between them.

Figure 2A:
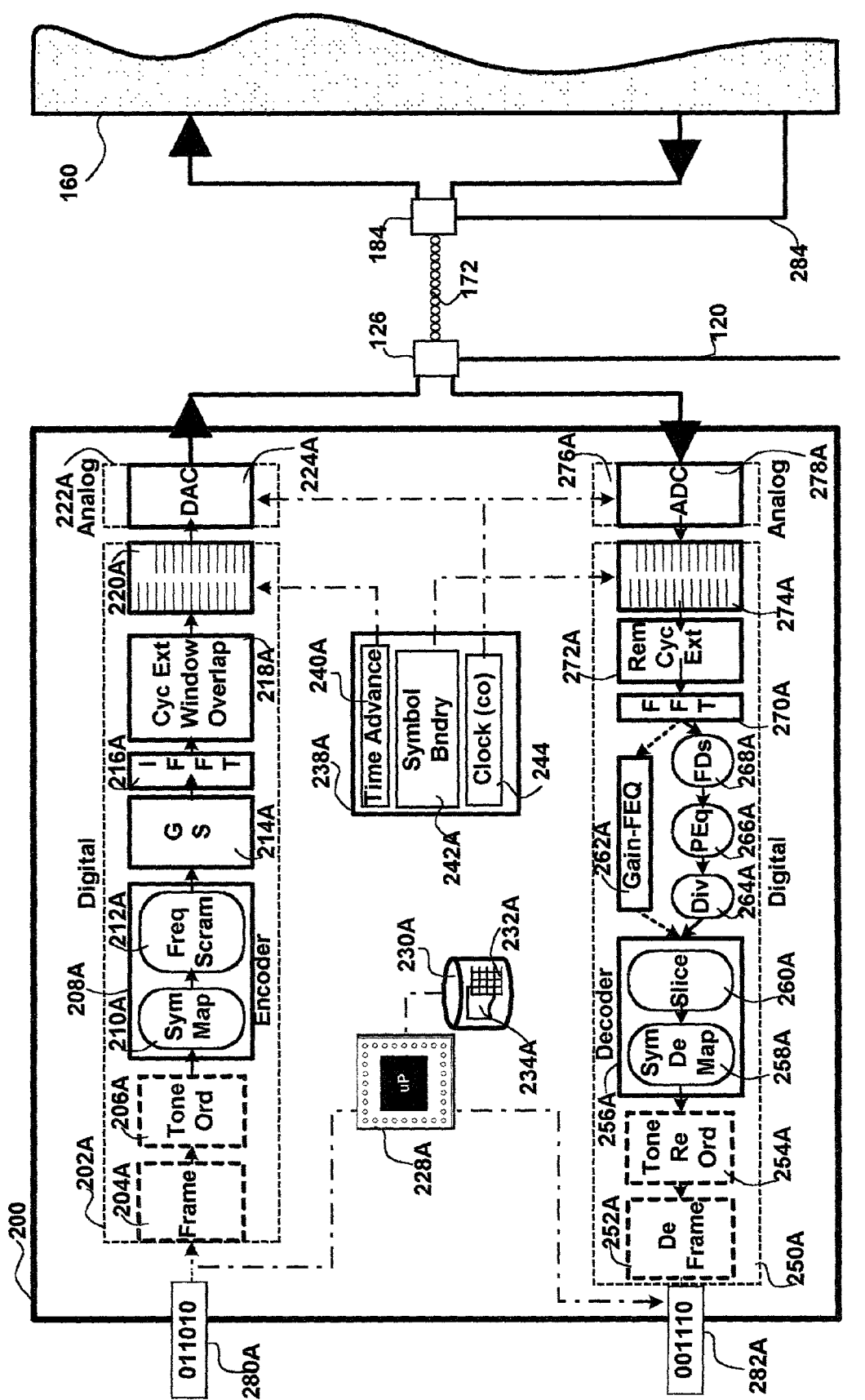
FIGS. 2A–B are detailed hardware block diagrams which show the transmit and receive path components of the logical and physical modems respectively in an embodiment of the current invention.
Figure 2B:
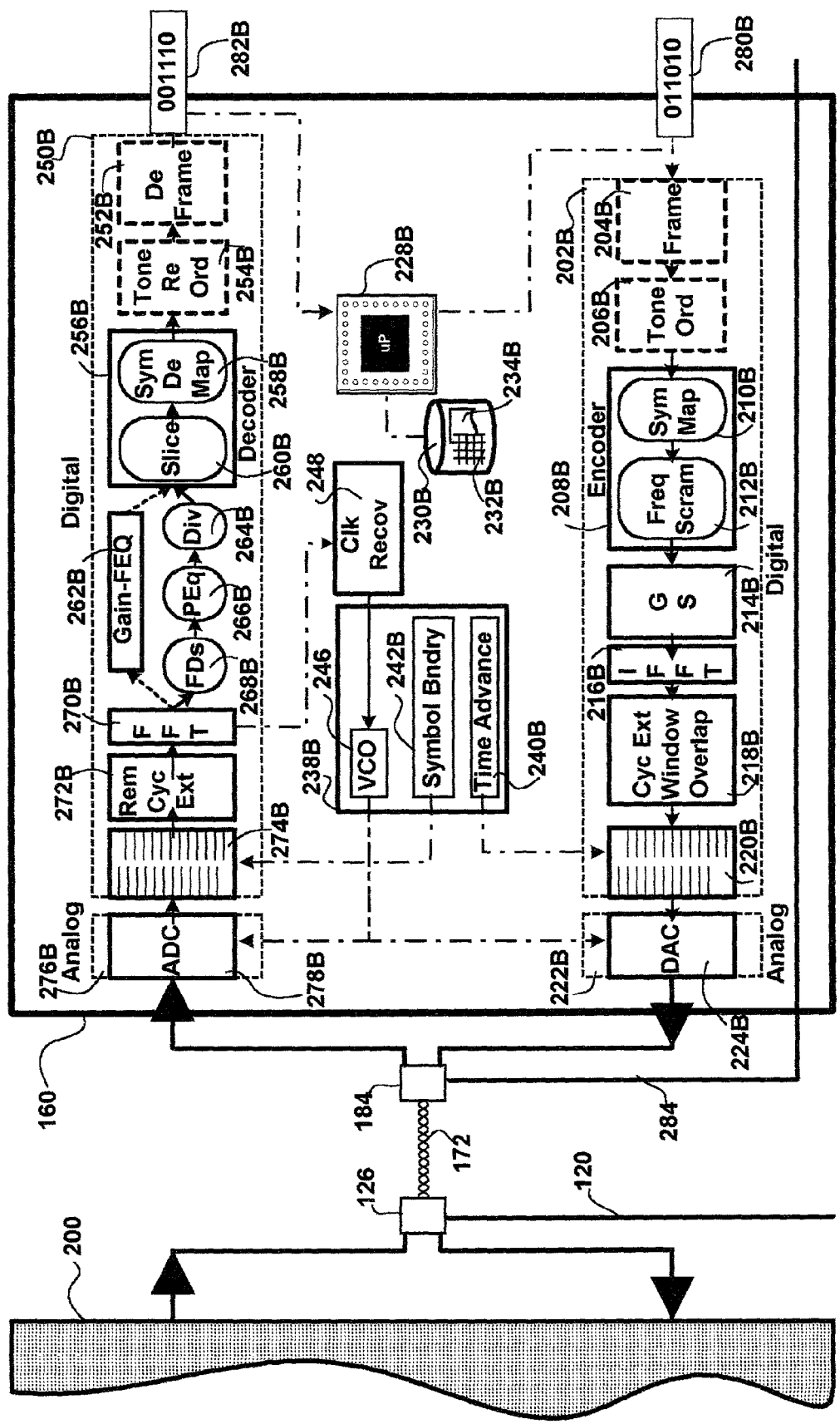

FIGS. 2A–B are detailed hardware block diagrams which show the transmit and receive path components of the logical and physical modems respectively in an embodiment of the current invention. The logical modem is represented in a circuit 200 with a transmit path and a receive path coupled via HFE 126 and subscriber line 172 with the HFE 184 of physical modem 160. The transmit path includes digital and analog portions 202A and 222A respectively for modulation of data. The signal line 120 is shown coupled to the HFE which in this embodiment of the invention contains appropriate filters, or splitter to divert voice band traffic.

During showtime the transmit path accepts a digital stream 280A as input and passes that stream through successive modulation stages. In the framer 204A the data is parsed into predefined packets of bits, with the number of bits determined by the bandwidth of the communication medium established during modem initialization. In the tone orderer 206A the bits are allocated across the tone bins associated with each of the DMT sub channels. The specific number of bits per tone is established during the initialization of the modem. Next in the encoder 208A the bits for each tone are converted to a complex number or sub-symbol which defines the phase and amplitude relationship with which to modulate each sub-channels carrier tone. Then after gain scaling in the gain scaler 214A all of the sub-symbols are converted from the frequency domain to tones in the time domain. This is accomplished in the inverse Fourier transform (IFFT) engine 216A. Next in module 218A the cyclic extension, windowing and window overlap is applied to the digitized symbol output by the IFFT. The delay advance buffer 220A couples module 218A with the Digital to analog converter (DAC) 224A which is part of the analog portion 222A of the transmit path. The analog portion may also include an interpolator and digital or analog filters, in alternate embodiments of the invention.

The receive path includes analog and digital portions 276A and 250A respectively for demodulation of data. During showtime the receive path accepts modulated data from subscriber line 172 and digitizes the received data in the analog-to-digital converter 278A which is part of the analog portion of the receive path. The analog portion may also include digital or analog filters and a decimator, in alternate embodiments of the invention. The digitized data is passed via delay advance buffer 274A to the cyclic prefix removal module 272A, where any cyclic prefix is removed from the digitized data associated with each incoming symbol. Next in the fast Fourier transform (FFT) engine each tone in the time domain is converted to a corresponding sub-symbol in the frequency domain. Each sub-symbol may be represented mathematically as a complex number expressing the phase and amplitude relationship between the carrier tone and the pilot or message data modulated thereon. Collectively each set of sub-symbols make up a symbol. When the sub-symbols include pilot and message data they are collectively identified as a training symbol. Next the appropriate gain scaling and frequency equalization is performed in the gain FEQ module 262A. Subsequently, each sub-symbol is decoded to a corresponding binary sequence using the slicer 260A and the symbol de-mapper 258A which are part of the decoder 256A. The resultant bits associated with each tone are then re-ordered into the initially transmitted sequence via the tone re-orderer 254A and de-framed in de-framer 252A. The resultant demodulated digital data stream 282A is output from the de-framer.

The core processor 228A is shown coupled to the transmit and receive path components as well as to the memory 230A and the synchronization module 238A. Memory 230A stores setup data 232A for the specific DMT protocols which the modem supports as well as initialization data 234A, e.g. gain tables, equalization parameters, PSD parameters etc. determined during the initialization of a pair of modems across a given communication medium, e.g. subscriber line 172. The synchronization module of the CO employs a system clock 244 to drive the DAC and the ADC on the transmit and receive paths respectively. The synchronization module also drives the delay advance buffers on the digital portion of the transmit and receive paths. The delay advance buffer 274A on the receive path is synchronized with symbol boundaries via the symbol boundary module 242A which is part of the synchronization module. The delay advance buffer 220A on the transmit path advances the transmission of each symbol with respect to the symbols received on the receive path in an amount set by the time advance module 240A which is part of the synchronization module.

During the handshake and training phase of initialization the transmit and receive path components are operated in a different manner than is the case for showtime. The framer and de-framer 204A, 252A, the tone orderer 206A and tone re-orderer 254A on the transmit and receive paths have reduced functionality. The core processor 228A supplies the encoder 208A with the appropriate pilot and message data, for each sub-channel or tone. Selected ones of the tones will be modulated with constant data corresponding with a pilot tone. The pilot tones and the complex data associated therewith are part of the DMT protocol stored in the memories of each of the pair of modems. Other selected ones of the tones will be modulated with variable data corresponding with each message. The symbol mapper 210A converts the pilot and message data for each tone to the complex number, a.k.a. sub-symbol that will be modulated on each tone. Collectively the sub-symbols associated with the pilot tones and message tones make up a training symbol which is converted from the frequency to the time domain by the IFFT 216A. Before conversion, pseudo random adjustments to the phase of each sub-symbol are made by the frequency scrambler 212A. The frequency scrambler is only operational during the training phase of operation. Scrambling each sub-symbol with a pseudo random number assures that the communication channel formed between the two modems will be fully characterized during initialization. The pseudo random number (PRN) sequence used in the scrambler 212A is stored in the respective memories of the sending and receiving modems. The messages generated by the processor convey to the remote modem 160 information such as: bandwidth allocation, radio frequency interference (RFI) bands, transmit power spectral density (PSD) in the downstream and upstream directions, whether power back off (PBO) is performed using a maximum receive PSD or using an upstream PSD mask, the reference PSD, and the overall length of the window at the transmitter. Some of the information depends on modem operational parameters, while other of the information is adaptively determined by monitoring power and gain parameters on the receive path. During training the modems swap roles as transmitter and receiver.

On the receive path the received tones are converted from the time to corresponding sub-symbols in the frequency domain by the FFT 270A. There is a sub-symbol for each of the pilot and message tones. The phase relationship between carrier and data as represented by each pilot sub-symbol derived from a pilot tone includes: a fixed contribution from the pilot data, a known contribution from the scrambling of that data in the transmit path, and a variable and unknown contribution resulting from the frequency dependent phase shifts introduced by the communication medium, e.g. subscriber line 172 which links the pair of modems. The phase relationship between carrier and data as represented by each message sub-symbol derived from a message tone includes: a variable and unknown contribution from the message data, a known contribution from the scrambling of that data in the transmit path, and a variable and unknown contribution resulting from the frequency dependent phase shifts introduced by the communication medium which links the pair of modems. Each pilot sub-symbol is passed to the FEQ module 262A where it is used to establish the equalization parameters for the FEQ. During modem initialization the pilot sub-symbols are also passed along with message sub-symbols to the message processing modules, e.g. the frequency de-scrambler 268A, the pseudo-equalizer 266A, and the diversity combiner 264A for message processing. These components are only required during the initialization phase of modem operation.

The frequency de-scrambler uses the known PRN sequence utilized by the scrambler of the remote modem to de-scramble the sub-symbols associated with both the message and pilot tones. This removes the phase shift introduced by the scrambler on the transmitting modem. Next in the pseudo-equalizer 266A each message sub-symbol is divided by the complex conjugate of a proximate pilot sub-symbol. This removes the unknown and frequency dependent phase error introduced by the communication medium. The accuracy of this approach is based on the realization that the frequency dependent phase shift introduced by the communication medium is substantially similar for a message tone and a proximate pilot tone. Next in the diversity combiner 264A noise is removed from each message tone by averaging redundant ones of the message tones with each other across a tone set. Next in the slicer 260A the complex number provided for each unique message by the diversity combiner 264A is quantized. The message sub-symbols in complex form are de-mapped to a corresponding set of digital bits. The bits are aggregated by the-processor 228A to a message. The processor then modifies transmit and receive path components in conformance with the message.

FIG. 2B shows the transmit and receive paths of the physical modem in an embodiment of the current invention. The physical modem 160 is represented with single transmit and receive paths coupled via HFE 184 and subscriber line 172 with the HFE 126 of logical modem 200 shown in FIG. 2A. The components shown on the transmit and receive paths are substantially identical to those discussed above in FIG. 2A with similar components labeled with the same reference number with a "B" suffix replacing the "A" suffix used to identify the components in the logical modem 200 shown in FIG. 2A. The signal line 284 is shown coupled to the HFE 184 which in this embodiment of the invention contains appropriate filters, or splitter to divert voice band traffic. The synchronizer module 238B in the remote modem is driven by a clock recovery module 248. That module is coupled to the digital portion 250B of the receive path to recover the CO clock there from. The clock recovery circuit uses a phase lock loop (PLL) and other circuits to generate an error signal with a voltage proportional to the phase error between the clock of the remote modem and the clock 244 at the CO. The error signal is used to drive a voltage controlled oscillator (VCO) 246 which is part of the synchronization module. The VCO drives the ADC 278B and the DAC 224B on the analog portions of the receive and transmit paths respectively of the modem 160. During the showtime phase the data stream 280B from the terminal 164 (See FIG. 1) is modulated on the digital 202B and analog 222B portions of the physical modem's transmit path, and the data stream 282B demodulated on the analog 276B and digital 250B portions of the receive path is provided to the terminal.

FIG. 3 is a detailed hardware block diagram of a portion of the transmit and receive path of the pair of modems shown in FIGS. 2A–B during the training phase of initialization. Selected transmit components of the modem 200 shown in FIG. 2A are shown coupled with selected receive components of the physical modem 160 shown in FIG. 2B. Specifically, the mapper 210A, scrambler 212A, and IFFT 216A on the transmit path of the modem shown in FIG. 2A are shown transmitting training symbols to the ITT 270B, the de-scrambler 268B, the pseudo-equalizer 266B, the diversity combiner 264B, the slicer 260B and the de-mapper 258B on the receive path of the physical modem shown in FIG. 2B. A plurality of sub-channels with indexes 0–16 of an exemplary modulation protocol, e.g. VDSL are shown. The tones of the odd sub-channels are modulated with pilot data 302 which in this case is a constant across all of the designated sub-channels. The tones of the even channels are modulated with one byte of message data 304 per training symbol. Both the pilot data and the message data are redundantly mapped onto the sub-channels. The pilot data 302 is in an embodiment of the invention the same across all of the pilot tones. The message data is redundant as well. Within a training symbol, the first two bits of the byte of message data 304 are modulated onto sub-channels 1, 9, 17 . . . ; the second pair of bits modulated on sub-channels 3, 11, 19 . . . ; the third pair bits modulated on sub-channels 5, 13, 21 . . . ; and the fourth pair of bits modulated on sub-channels 7, 15, 23 . . . . There is thus redundancy of pilot data across pilot tones and message data across message tones. The scrambler utilizes a PRN sequence 306 to scramble each of the pilot and message tones. The scrambled pilot and message tones are converted by the IFFT from the frequency to the time domain for transmission as a training symbol, to the receiving modem, which in this case is the remote physical modem 160 (See FIGS. 1, 2B) and the selected components on the receive path thereof. The analog components on the transmit and receive path as well as the communication medium impart frequency dependent phase shifts, e.g. channel effects 300 to the communication channel established between the transmit and receive paths.

The FFT 270B converts each received training symbol from the time to the frequency domain. The pilot tones at this stage are copied out via line 340 to the input to the frequency equalizer 262B for use in a conventional manner during the training phase of the equalizer and the establishment of the appropriate weighting coefficients. In parallel with the training of the equalizer the pilot tones and the message tones from the FFT output are provided as inputs to the de-scrambler 268B. This begins the process of message processing which is carried out in parallel with the training of the equalizer and generation of equalizer weighting coefficients. The de-scrambler uses the same PRN sequence 306 as the scrambler in de-scrambling the pilot and message tones. The de-scrambler removes known phase changes introduced into the transmitted pilot tones and message tones during scrambling. Next the pseudo-equalizer removes the unknown and variable frequency dependent phase shift introduced into each of the pilot and message tones by the communication medium and the transmit and receive path components. The frequency dependent phase shift removal is accomplished without use of the equalizer 262B, which at this stage is still in the training phase and has not yet developed equalizer weighting coefficients. This parallel capability, i.e. equalizer training and message processing, greatly speeds up the training phase of modem initialization. The actual frequency dependent phase shift removal is accomplished by complex multiplication of each de-scrambled message sub-symbol, with the complex conjugate of a proximate pilot sub-symbol. The effectiveness of the approach is predicated on the insight that the frequency dependent phase shift is substantially similar for a message tone and a proximate pilot tone. After removal of the frequency dependent phase shift the message sub-symbols are input to the diversity combiner. In the diversity combiner 264B message sub-symbols containing redundant message bits are combined with one another in order to derive a single complex number representation of each group of redundant message sub-symbols. Combination may be accomplished in different ways including: averaging of redundant tones with one another or weighted averaging of redundant tones with one another. After diversity combination each resultant unique message sub-symbol associated with the $1^{st}$ through $4^{th}$ pair of bits of the byte of message data contained in each training symbol is sent to the slicer 260B where they are quantized. The quantized message sub-symbols are the converted to the corresponding binary message data in the de-mapper 258B. The de-mapper maps sub-symbols to bits.

The core processor of the modem receiving the message, e.g. core processor 228B (See FIG. 2B) adjusts the required transmit and receive path components in response to the message. The message may contain new or updated parameters for: bandwidth allocation, radio frequency interference (RFI) bands, transmit power spectral density (PSD) in the downstream and upstream directions, whether power back off (PBO) is performed using a maximum receive PSD or using an upstream PSD mask, the reference PSD, and the overall length of the window at the transmitter. Responsive to the message the core processor may adjust the number of tone bins for the FFT/IDFT (270B, 216B See FIG. 2B for example), the gain tables (not shown) for the gain scalers (214B, 262B See FIG. 2B for example), the power applied by the line amplifier (not shown) in the analog front end (AFE) (222B See FIG. 2B for example); the length of the window and or cyclic extension utilized in the modules for adding and removing cyclic extension and windows (218B, 272B See FIG. 2B for example); and the power back off algorithm implemented for the transmit path under the control of the core processor 228A.

Figure 4:
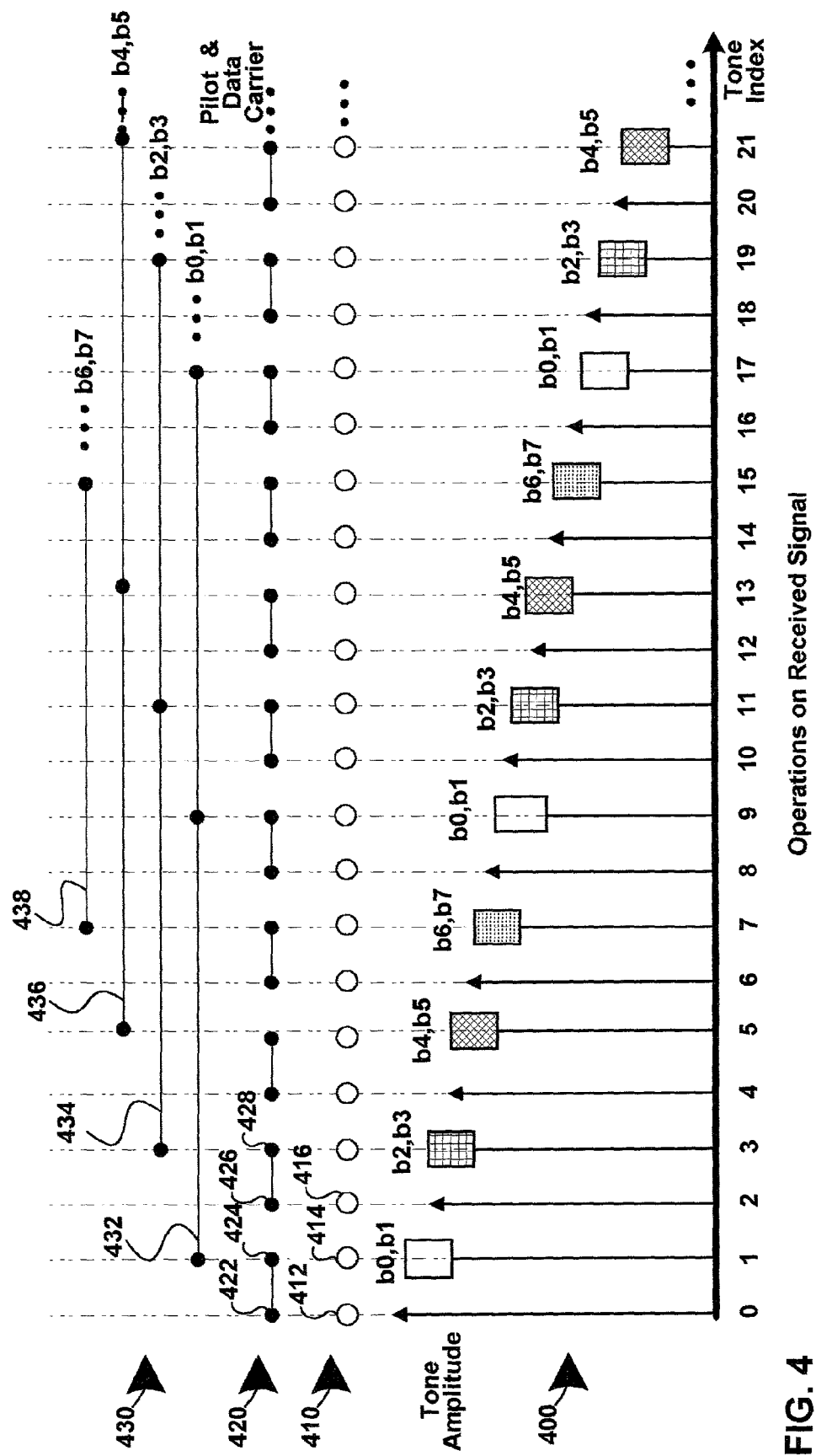
FIG. 4 is a signal diagram showing in the frequency domain an example of a symbol with tones carrying pilot and message data, transmitted between the pair of modems during the training phase of initialization.

FIG. 4 is a signal diagram showing in the frequency domain an example of a symbol with tones carrying pilot and message data, transmitted between the pair of modems during the training phase of initialization. The training symbol 400 contains pilot tones and message tones with the pilot tones modulated with pilot data and the message tones modulated with message data. The particular interlacing shown for training symbol 400 corresponds with a VDSL standard. In the example shown in FIG. 4 the amplitude of the message and pilot tones generally decreasing with increasing frequency. Each tone is identified by an associated tone index, a.k.a. bin number. Tones with an odd index carry pilot data and tones with an even index carry message data. The message tones as discussed above are redundant with each byte of message data mapped two bits per tone to the odd tones within each group of 8 tones. The invention is equally applicable to alternate mappings of pilot and message tones. Pilot tones for example might be mapped to every $3^{rd}$ or greater tone index with the message tones filling the gaps. Pilot tones might occur with greater or lesser frequency than message tones of each training symbol depending on the particular standard for multi-tone communication between the modems.

Once a training symbol is received and converted to the frequency domain the decoding of the message in an embodiment of the invention includes the steps of de-scrambling 410, pseudo equalizing 420, and diversity combining 430. The de-scrambling step involves removing the known phase shift introduced into the pilot and message tones during transmission. Each tone is individually de-scrambled. Tones 412–416 with corresponding index numbers 0–2 are referenced. De-scrambling may in alternate embodiments of the invention leave a bias rotation in the de-scrambled tones. An embodiment of the invention in which this is the case is shown and discussed in the following FIGS. 5–6 and accompanying text. The pseudo equalizing step 420 involves dividing each message tone by a proximate pilot tone. In the complex number domain this involves multiplication each message sub-symbol by the complex conjugate of an adjacent pilot sub-symbol. In the embodiment shown message tone 424 with index number 1 is equalized with the adjacent lower frequency pilot tone 422 with index 0. In this embodiment of the invention each message tone across the training symbol is pseudo-equalized with an adjacent lower frequency pilot tone. In an alternate embodiments of the invention a pilot tone may be utilized to pseudo-equalize more than one message tone. For example pilot tone 426 with index 2, may be utilized to pseudo-equalize message tones proximate to it at both a higher frequency, e.g. message tone 428 with index 3, and a lower frequency, e.g. message tone 424 with index 1. In other embodiments of the invention a pilot tone may be used to pseudo-equalize a message tone that is proximate to but not adjacent to it in frequency space. Pseudo equalizing may in alternate embodiments of the invention leave a bias rotation in the de-scrambled tones. An embodiment of the invention in which this is the case is shown and discussed in the following FIG. 6 and accompanying text. After pseudo equalization, diversity combining step 430 utilizes message tones with redundant data modulated thereon to generate a unique sub-symbol from each set of message tones with redundant data. As discussed above this process may involve simple or weighted averaging of redundant message tones with one another.

Figure 5:
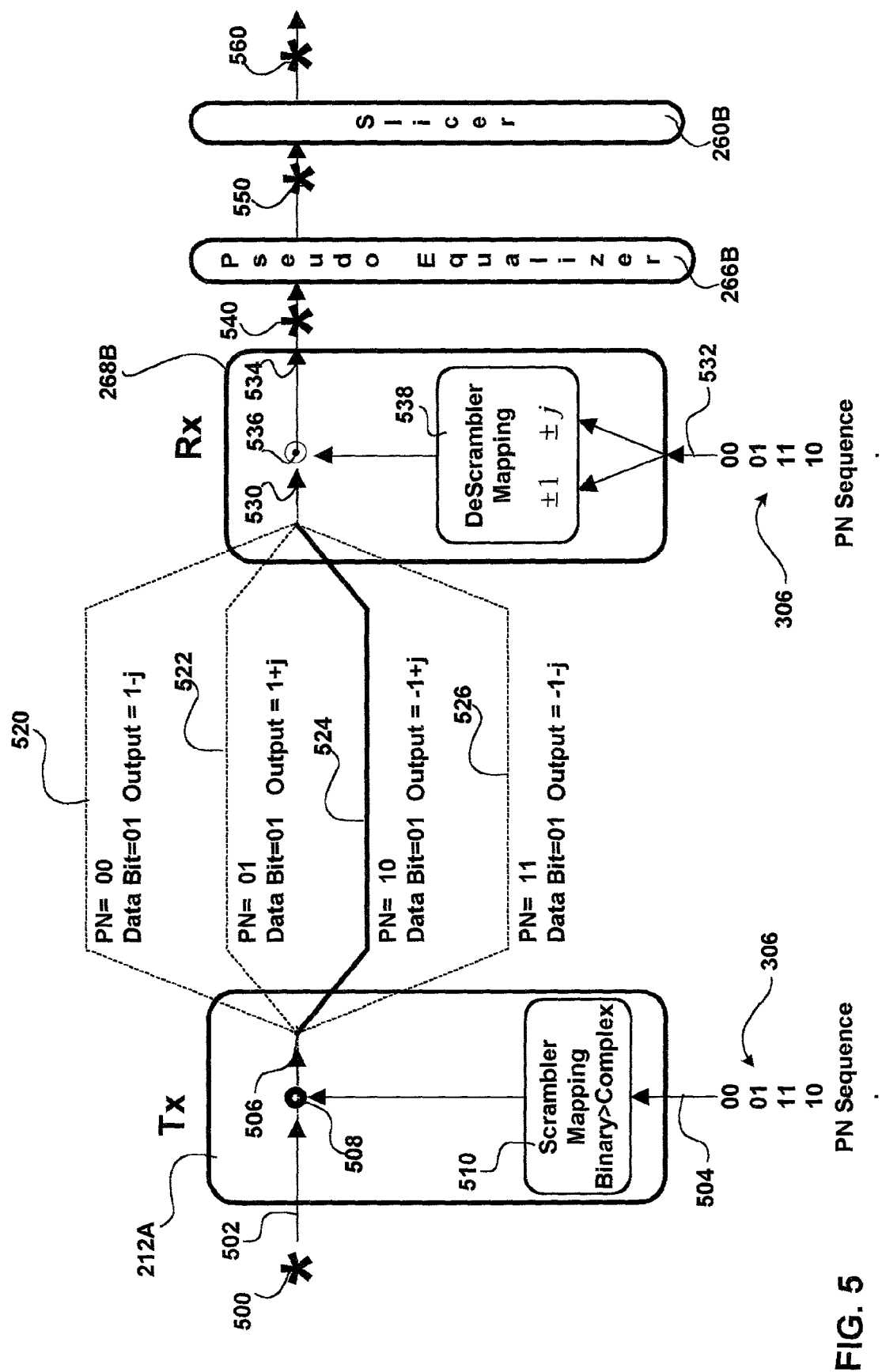
FIG. 5 is a hardware block diagram showing the scrambler, de-scrambler and slicer used in an embodiment of the invention during the training phase of operation.

FIG. 5 is a hardware block diagram showing the scrambler, de-scrambler and slicer used in an embodiment of the invention during the training phase of operation. The constellation utilized during the training phase in this embodiment of the invention is a 4 point quadrature phase modulation (QPM) constellation. Amplitude is kept constant during the training phase in this example, which corresponds again with the V-DSL standard. The method and apparatus of the current invention may be utilized with equal advantage to decode message data modulated with more complex constellations, including constellations utilizing both phase and amplitude modulation such as 8 or higher point quadrature phase amplitude modulated (QPAM) data. The novel message processing circuit of the current invention is equally applicable to more complex training constellations including those with added phase or amplitude modulation. In this embodiment of the invention the de-scrambler utilizes a de-scrambler map which leaves a constant bias of $$\pi/4$$

radians in the de-scrambled tones, which bias is removed by the slicer 260B (See FIG. 2B). In the embodiment shown a pair of message input bits, e.g. binary 01, maps to a sub-symbol in the 4$^{th}$ quadrant of the constellation 500 and is presented to the signal input 502 of the scrambler 212A (See FIG. 2A). Scrambling across a tone set may be handled serially or in parallel. The scrambler 212A is shown with the PRN sequence 306 applied to the scrambling input 504. A binary pair of bits is delivered at the scrambling input and is mapped from a binary to a complex number in the mapper 510. The multiplier 508 determines the product of the complex signal at input 502 and the complex number output by the mapper 510. The scrambled sub-symbol is delivered at the output 506. With a 4 point constellation scrambling will result in a single input being scrambled to an output in any of the four quadrants of the constellation. These four possible outputs from a single signal input are represented on output lines 520–526.

After transmission and receipt by the opposing modem and conversion to the frequency domain each sub-symbol is de-scrambled. Symmetrical de-scrambling would result in the same complex number output by the de-scrambler as was input to the scrambler plus any channel dependent phase shifts picked up during transmission. Asymmetrical de-scrambling such as will be discussed in this and the following FIGS. 6A–C can also be utilized to simplify the processing time associated with de-scrambling. Asymmetrical refers to de-scrambling which leaves a bias rotation in the de-scrambled sub-symbols.

In this embodiment of the invention de-scrambling is asymmetrical with a bias of $$\pi/4$$

radians in the de-scrambled tones. The de-scrambler 268B accepts the same PRN sequence 306 as the scrambler. That sequence is input at the de-scrambler input 532 and subject to de-scrambler mapping in which it is converted to a complex number. The de-scrambler takes a signal on signal input 530 and the complex number output of the de-mapper 538 and determines the product in multiplier 536. The complex number product at output 534 is shown in constellation 540. Subsequently the complex number outputs for message and pilot tones are subject to subsequent steps of pseudo-equalizing and in the case of message tones diversity combining after which the resultant sub-symbol for each message sub-symbol or tone is quantized in slicer 260B (See FIG. 2B). The combined operation of asymmetric de-scrambling plus pseudo-equalization leaves a bias rotation of $$-\pi/4.$$

The slicer during quantization removes the bias of $$\pi/4$$

radians that remains in the sub-symbols after de-scrambling.

The following Tables 1 and 2 show scrambler and de-scrambler mapping for alternate embodiments of the invention in which pilot and message tones are modulated in a 4 point QAM constellation. The data in columns A–E is common to Tables 1 and 2. Columns A–B show the binary input data in column A and the corresponding complex number mapping thereof in column B. Columns C–D show the pseudo random numbers in binary form in column C and the scrambler mapping thereof into complex form in column D. These are the numbers with which the input bits, either pilot data or message data are scrambled. Column E shows the corresponding complex number outputs.

TABLE 1

| A<br>Data<br>(B$_i$,<br>B$_{i+1}$) | B<br>X + Y$_i$<br>Data | C<br>PN<br>(D$_{2n}$,<br>D$_{2n+1}$) | D<br>U + V$_i$<br>PN$_s$ | E<br>Scrambled<br>Data ×<br>PN = S | H<br>Complex<br>Conj<br>PN$_d$ | I<br>Descrambled<br>S × PN$_d$ = D |
|---|---|---|---|---|---|---|
| (0,0) | 1 + i | (0,0) | 1 | 1 + i | 1 | 1 + i |
| (0,0) | 1 + i | (0,1) | i | −1 + i | −i | 1 + i |
| (0,0) | 1 + i | (1,1) | −1 | −1 − i | −1 | 1 + i |
| (0,0) | 1 + i | (1,0) | −i | 1 − i | i | 1 + i |
| (1,0) | −1 + i | (0,0) | 1 | −1 + i | 1 | −1 + 1 |
| (1,0) | −1 + i | (0,1) | i | −1 − i | −i | −1 + i |
| (1,0) | −1 + i | (1,1) | −1 | 1 − i | −1 | −1 + 1 |
| (1,0) | −1 + i | (1,0) | −i | 1 + i | i | −1 + 1 |
| (1,1) | −1 − i | (0,0) | 1 | −1 − i | 1 | −i − i |
| (1,1) | −1 − i | (0,1) | i | 1 − i | −i | −i − i |
| (1,1) | −1 − i | (1,1) | −1 | 1 + i | −1 | −1 − i |
| (1,1) | −1 − i | (1,0) | −i | −1 + i | i | −1 − i |
| (0,1) | 1 − i | (0,0) | 1 | 1 − i | 1 | 1 − i |
| (0,1) | 1 − i | (0,1) | i | 1 + i | −i | 1 − i |
| (0,1) | 1 − i | (1,1) | −1 | −1 + i | −1 | 1 − i |
| (0,1) | 1 − i | (1,0) | −i | −1 − i | i | 1 − i |

Column H in Table 1 shows the complex number used do de-scramble the received signal, in this case the scrambled signal in column E. The resultant de-scrambled output is shown in Column I. The sub-symbols shown in column I at the de-scrambler output are the same as, i.e. symmetrical with, the sub-symbols at the input shown in Column B.

TABLE 2

| A<br>Data<br>(B$_i$,<br>B$_{i+1}$) | B<br>X + Y$_i$<br>Data | C<br>PN<br>(D$_{2n}$,<br>D$_{2n+1}$) | D<br>U + V$_i$<br>PN$_s$ | E<br>Scrambled<br>Data ×<br>PN = S | F<br>0/1 = +/−<br>PN$_d$ | G<br>Descrambled<br>S × PN$_d$ = D |
|---|---|---|---|---|---|---|
| (0,0) | 1 + 1 | (0,0) | 1 | 1 + i | 1 + i | 2i |
| (0,0) | 1 + 1 | (0,1) | i | −1 + i | 1 − i | 2i |
| (0,0) | 1 + 1 | (1,1) | −1 | −1 − i | −1 − i | 2i |
| (0,0) | 1 + 1 | (1,0) | −i | 1 − i | −1 + i | 2i |
| (1,0) | −1 + 1 | (0,0) | 1 | −1 + i | 1 + i | −2 |
| (1,0) | −1 + 1 | (0,1) | i | −1 − i | 1 − i | −2 |
| (1,0) | −1 + 1 | (1,1) | −1 | 1 − i | −1 − i | −2 |
| (1,0) | −1 + 1 | (1,0) | −i | 1 + i | −1 + i | −2 |
| (1,1) | −1 − 1 | (0,0) | 1 | −1 − i | 1 + i | −2i |

TABLE 2-continued

| A<br>Data<br>($B_i$,<br>$B_{i+1}$) | B<br>X + $Y_i$<br>Data | C<br>PN<br>($D_{2n}$,<br>$D_{2n+1}$) | D<br>U + $V_i$<br>$PN_s$ | E<br>Scrambled<br>Data ×<br>PN = S | F<br>0/1 = +/−<br>$PN_d$ | G<br>Descrambled<br>S × $PN_d$ = D |
|---|---|---|---|---|---|---|
| (1,1) | −1 − 1 | (0,1) | i | 1 − i | 1 − i | −2i |
| (1,1) | −1 − 1 | (1,1) | −1 | 1 + i | −1 − i | −2i |
| (1,1) | −1 − 1 | (1,0) | −i | −1 + i | −1 + i | −2i |
| (0,1) | 1 − i | (0,0) | 1 | 1 − i | 1 + i | 2 |
| (0,1) | 1 − i | (0,1) | i | 1 + i | 1 − i | 2 |
| (0,1) | 1 − i | (1,1) | −1 | −1 + i | −1 − i | 2 |
| (0,1) | 1 − i | (1,0) | −i | −1 − i | −1 + i | 2 |

Column F in Table 2 shows the complex number used to de-scramble the received signal, in this case the scrambled signal in column E. The resultant de-scrambled output is shown in Column G. The sub-symbols shown in column G at the de-scrambler output are asymmetrical with the sub-symbols at the input shown in Column B. The de-scrambler in this embodiment of the invention leaves a bias of $$\pi/4$$

radians in each sub-symbol which bias is removed in the slicer.

FIGS. 6A–D are graphs showing the constellations utilized in the training phase and the de-scrambling, pseudo-equalizing and slicing thereof in the embodiment of the invention shown in FIG. 5. The constellations 500, 540, 550 and 560 are 4 point constellations resulting from the QAM modulation utilized on each tone in accordance with the VDSL standard. The slicer has decision regions defined by axis 552 and 554 which reverse the bias which remains after de-scrambling.

The following is a mathematical exposition of the embodiment of the invention discussed above. Received pilot and message tones after asymmetrical de-scrambling as discussed above in connection with Table 2 are shown in the following Equations 1 and 2 respectively. The frequency dependent phase shifts for the pilot and message tones are $\phi_k$ and $\phi_{k+1}$ respectively. The pilot tones having even indices, e.g. k=0,2,4,6,8 . . . N and the message tones having odd indices, e.g. k+1=1,3,5,7,9 . . . N−1 where N is the total number of tones in a training symbol. In the following Equation 1 $\phi_k$ is the phase introduced by the channel, the first $$\frac{\pi}{4}$$

is the pilot data, and the second $$\frac{\pi}{4}$$

is the bias rotation left by asymmetrical de-scrambling. In the following Equation 2 the $\phi_{k+1}$ is the phase shift introduced by the communication channel between the modems, $\Phi_{k+1}$ is the message datg, and $$\frac{\pi}{4}$$

is the bias rotation left by asymmetric de-scrambling.

Equation 1: $T_k = e^{j(\phi_k + \frac{\pi}{4} + \frac{\pi}{4})}$

Equation 2: $T_{k+1} = e^{j(\phi_{k+1} + \Phi_{k+1} + \frac{\pi}{4})}$

Pseudo-equalization of a message sub-symbol with an adjacent lower frequency pilot sub-symbol is set forth mathematically in the following Equation 3. The complex conjugate of the pilot sub-symbol is multiplied by the adjacent higher frequency message sub-symbol. The frequency dependent phase shifts in the message and pilot tone are substantially identical and thus substantially cancel one another $\phi_{k+1} - \phi_k \approx 0$. The product contains the message data in the complex number form of a message sub-symbol with a phase bias of $$\frac{\pi}{4}$$

radians.

Equation 3: $T_k^* \cdot T_{k+1} \approx e^{j(\Phi_{k+1} - \frac{\pi}{4})}$

After pseudo equalizing it is possible in an embodiment of the invention to take advantage of the frequency diversity, by combining the message sub-symbols which carry redundant data before presentment to the slicer. The number of tones carrying redundant message data is given by the following Equation 4 in which N is the total number of tones and in which k=0 indicates the tones caring bits 0,1; k=2 indicates the tones carrying bits 2,3; k=4 indicates the tones carrying bits 4, 5; and k=6 indicates the tones carrying bits 6, 7. The brackets indicated that the mathematical "floor" or integer result is to be obtained for the terms within the brackets.

Equation 4: $\left\lfloor \dfrac{N - (k+1)}{10} \right\rfloor + 1$

If k=6 is substituted into the Equation 4 then the total number of elements in the combination will be equal in each pair of decoded message bits. Equation 5 sets forth a general equation for diversity combining of the above discussed message data.

Equation 5: $D_k = \dfrac{\sum_{i=M}^{\lfloor 0.1(N-7) \rfloor - L} T_{k+10i}^* \cdot T_{k+1+10i}}{\lfloor 0.1(N-7) \rfloor + 1 - (M+L)}$ where k=0,2,4,6 are the indices for the $1^{st}$ through $4^{th}$ pair of message bits $D_k$;

M=0,1,2, . . . , {0.1(N−7)−1};

L=0,1,2, . . . , {0.1(N−1)−1}; and

L+M ≤ {0.1(N−7)−1}.

When N=256 tones the following Equations 6A–D shows the diversity combined results for each of the 4 unique message tones $D_0, D_2, D_4, D_6$.

Equation 6A: $D_0 = \frac{1}{25} \sum_{i=0}^{24} T^*_{10i} \cdot T_{1+10i}$

Equation 6B: $D_2 = \frac{1}{25} \sum_{i=0}^{24} T^*_{2+10i} \cdot T_{3+10i}$

Equation 6C: $D_4 = \frac{1}{25} \sum_{i=0}^{24} T^*_{4+10i} \cdot T_{5+10i}$

Equation 6D: $D_6 = \frac{1}{25} \sum_{i=0}^{24} T^*_{6+10i} \cdot T_{7+10i}$

After diversity combining each of the four unique message sub-symbols corresponding with each of the 4 unique pairs of message data are sliced in the manner defined by the following Equation 7. Slicing quantizes each sub-symbol and removes any bias left after de-scrambling and pseudo-equalization.

Equation 7:

IF $|X| > |Y|$

If $X > 0$ then ... Message Data = 00

Else ... Message Data = 11

ELSE

If $y > 0$ ... Message Data = 10

Else ... Message Date = 01 where X and Y are the real and imaginary coefficients of each sub-symbol presented to the slicer. In an embodiment of the invention utilizing symmetric de-scrambling the decision rule set forth in Equation 7 would be altered accordingly.

Figure 7A:
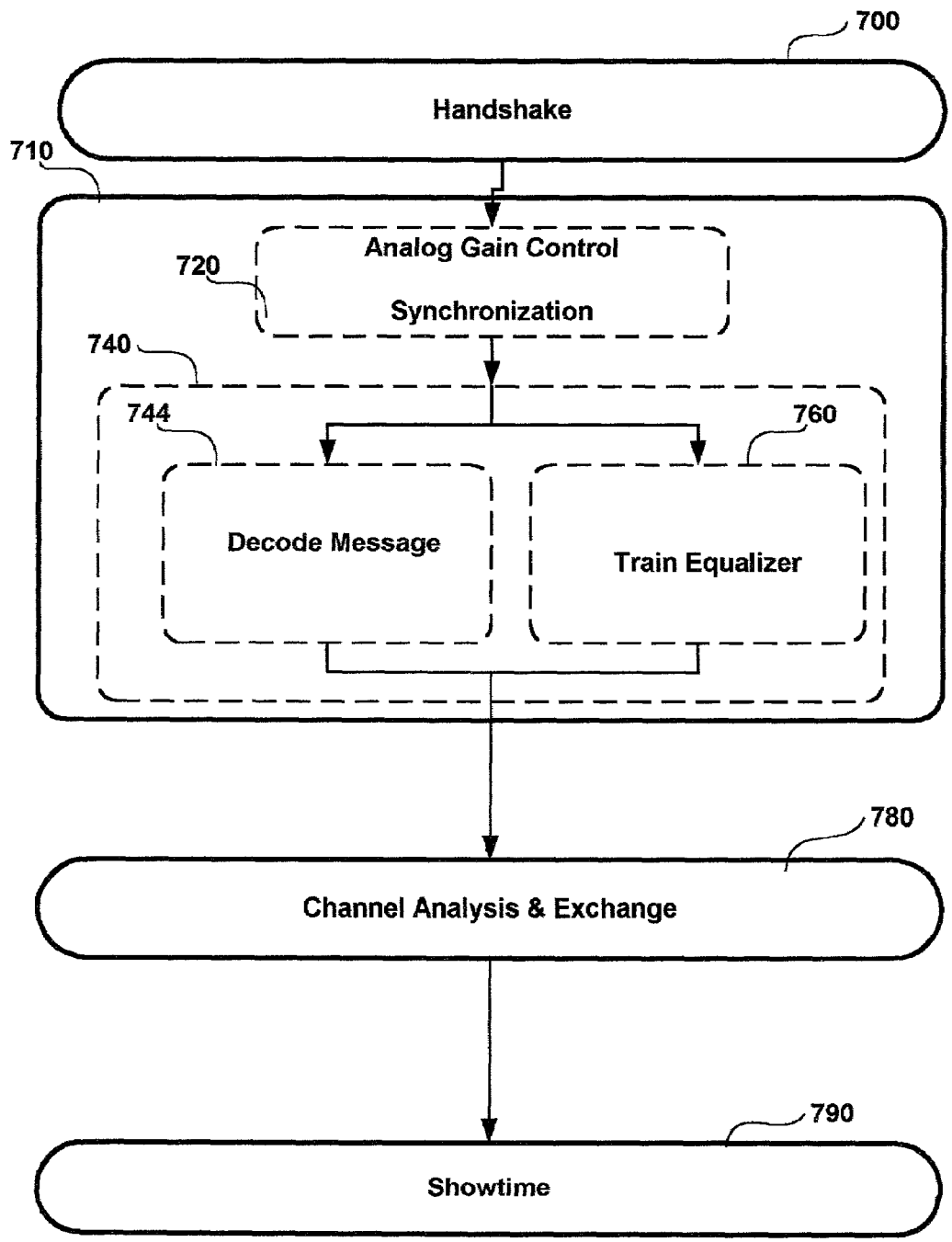
FIG. 7A is a process flow diagram of the various initialization phases for modems operated in accordance with an embodiment of the current invention.

FIG. 7A is a process flow diagram of the various initialization phases for modems operated in accordance with an embodiment of the current invention. Processing begins with the handshake phase 700. In the handshake phase the two modems pass to each other the basic identity information such as: inverse or discrete Fourier transform size and the initial length of the cyclic extension. This information is passed using a modulation protocol such as binary phase shift key (BPSK) with just a few carriers. The use of BPSK allows information to be exchanged without using DMT modulation. The next and subsequent initialization phases utilize DMT modulation with various degrees of complexity up to the showtime phase at which the full transport capabilities of the modems and the subscriber line by which they are coupled have been trained.

Next is the training phase 710 which involves a first step of gain setting and synchronization 720. The gain settings are set in the analog portion of the receive path based on the power of the received signal. In the synchronizing step the clocks of the opposing modems are synchronized and the symbol boundaries are determined. The next step 740 involves both equalizer training 760 and message processing 744. In an embodiment of the current invention these steps are executed in parallel. The concurrency of these steps speeds up this phase of the training. The frequency domain equalizer uses the received pilot tones to train the equalizer at the same time the pilot and message tones are used to decode the message tones. At the end of the equalizer training 760 the gain tables have been established and weights associated with time or frequency domain equalization and echo cancellation have been determined. At the completion of the training phase control passes to step 780 in which channel analysis and exchange of bit loading is performed. During channel analysis each tone is modulated with varying amount of data in order to maximize the data carrying capability of the communication medium that links the modems. During this phase the modems pass parameters which allow each to establish a bit loading for each tone across a tone set. At the completion of the channel analysis and exchange the modems enter showtime state 790 in which communication of voice, data, video, etc. across the communication medium begins.

Figure 7B:
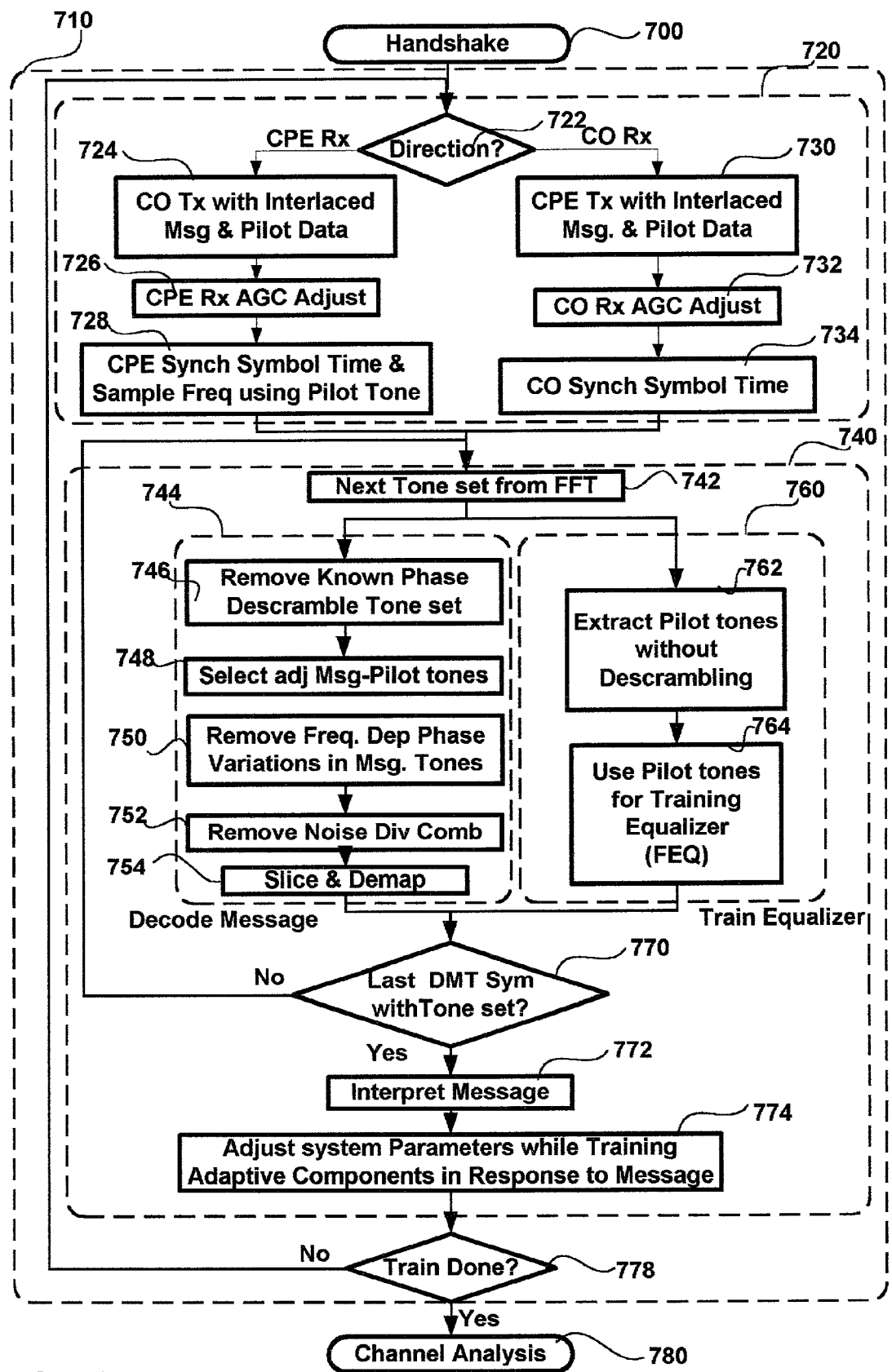
FIG. 7B is a detailed process flow diagram of the training phase of initialization shown in FIG. 7A.

FIG. 7B is a detailed process flow diagram of the training phase 710 of modem initialization shown in FIG. 7A. The initial step of the training phase is gain setting and synchronization 720. In decision step 722 it is determined which of the pair of modems will transmit and which will receive. In the case where a CO modem and a CPE modem are involved the CO modem will typically start transmitting. Where the CO transmits processing begins with step 724 in which the CO transmits the training symbols with interlaced pilot and message tones. In process 726 the CPE modem performs automatic gain control (AGC) adjustment which takes place in the analog portion 276AB (See FIGS. 2AB) of the receive path. Next in process 728 the CPE modem synchronizes its clock and symbol boundaries with the CO modem and sets the sampling frequency of its ADC in the receive path. Control then returns (return path not shown) to decision process 722 in which direction is then shifted with the synchronizing now involving the CPE modem transmitting and the CO modem receiving. In step 730 the CPE transmits training symbols with pilot and message tones interlaced with one another. In process 732 the CO modem performs AGC adjustment. Then in process 734 the CPE synchronizes its receive and transmit paths with the symbol boundaries of successive training symbols. Once synchronization of the CO and CPE modems is complete control passes to the training phase 740.

The training phase commences with the output in process 742 of the individual message and pilot sub-symbols associated with each successive training symbol from the FFT engine of the associated modem. The pilot sub-symbols associated with pilot tones are passed to both processes 744 and 760 for message processing and equalizer training respectively. The message sub-symbols associated with message tones are passed to the message processing step 744.

In the equalizer training process 760 the pilot sub-symbols are extracted without de-scrambling and passed to process 764 where they are used to train the associated frequency domain equalizer 262A or B for example (See FIGS. 2AB). Generally the FEQ corrects frequency dependent phase and amplitude distortion within the sub-symbol of each symbol. The waveforms of the received carrier tones do not correspond to the original constellation points, having been distorted in phase during transmission across the communication medium. Phase shifts will vary with frequency of each tone. The FEQ has one complex tap for each sub-channel resulting in an N by two-dimensional equalizer coefficient vector. The FEQ coefficient vector has the inverse frequency response of the equivalent channel, including transmit and receiver filters and the time domain equalizer if any. After training phase the FEQ coefficient vector is established. During the showtime phase of modem operation the sub-symbols of the FFT output are equalized in the FEQ using the FEQ coefficient vector established during the training phase. The message processor components, i.e the frequency de-scrambler 268AB, the pseudo-equalizer 266AB and the diversity combiner 264AB are bypassed during the showtime phase of operation. Also within the decoder the slicer reverts to showtime operation performing strictly a quantization of incoming sub-symbols from the FEQ 262AB (See FIGS. 2AB).

Message processing in this embodiment of the invention, is accomplished in parallel with FEQ training. The first of the steps associated with message processing is the removal of known phase shifts introduced into both message and pilot tones of each tone set in the de-scrambling step 746. Next in process 748 pairs of message sub-symbols and proximate pilot sub-symbols are selected. In this embodiment of the invention the pilot sub-symbol selected for pairing with each message sub-symbol is adjacent to and below the frequency associated with the message sub-symbol. In alternate embodiment of the invention the pilot tone would be proximate but not adjacent to the message tone with which it is paired. The pilot tone for example with tone index 4 (See FIG. 4) might be used to equalize a message tone with tone index 1. In an alternate embodiment of the invention different pairs of message and pilot tones might have a pilot tone in common. For example pilot tone with index 4 might be used to equalize message tone with index 3 and the message tone with index 5. Then in process 750 the frequency dependent phase variations in each of the de-scrambled message sub-symbols are removed by combination with an adjacent or a proximate pilot sub-symbol as discussed above in connection with FIGS. 3–4. Then in process 752 noise is removed from the pseudo-equalized message by diversity combination of message sub-symbol modulated with redundant message bits. Then in process 754 the unique message sub-symbols are sliced and de-mapped as discussed above in connection with FIGS. 3–4. After completion of a round of equalizer training and message processing with the message and pilot sub-symbols of a training symbol, control passes to decision process 770. If the training symbols are not complete then control returns to process 742. If it is determined in process 770 that receipt of a set of successive training symbols has been completed then control passes to process 772 in which the message is interpreted by the core processor. The core processor initiates in process 774 changes in the adaptive components of the modems receive and transmit path responsive to the received message. This may include, changes in PSD, gain tables and cyclic prefix. After adjusting the transmit and receive path components in response to the message control passes to decision process 778 in which the training process is reversed between the modems in decision process 722 or in which it is determined PSD training is complete and control is passed to the channel analysis process 780. In modems implementing the VDSL standard with DMT modulation, the training of the CO and remote modems occurs concurrently on the discrete frequency band(s) established for upstream and downstream communication. Generally the frequency de-scramblers 268AB, pseudo-equalizers 266AB, diversity combiners 264AB, and slicers 260AB (See FIGS. 2AB) may be implemented in software, firmware or hardware. Additionally, these processes or corresponding components are not operative during the showtime phase 790. In alternate embodiments of the invention, it is possible to further simplify the training processes or components beyond what is discussed above. For example, where the training symbols are transmitted without scrambling no frequency de-scrambler is required on the receive path of the receiving modem. In embodiments of the invention where the constellation associated with each tone is 4 point or less it may be possible to dispense with the amplitude equalization. In embodiments of the invention where redundancy is not available or does not provide significant noise reduction it may be possible to dispense with the diversity combiner. In an embodiment of the invention where the de-scrambler implements symmetric de-scrambling and the constellation associated with the modulation of each tone is 4 point or less it may also be possible to dispense with the slicer 260AB (See FIGS. 2AB). In an embodiment of the invention where the de-scrambler implements asymmetric de-scrambling and the constellation associated with the modulation of each tone is 4 point or less it may also be possible to dispense with the slicer 260AB (See FIGS. 2AB).

In an alternate embodiment of the invention in which the communication medium linking the modems is wireless the above described message processing methods and apparatus may be utilized with equal advantage during both training and showtime phases. In many wireless standards such as IEEE 802.1 A both training and showtime symbols include pilot tones and message tones.

In an alternate embodiment of the invention a device equivalent to an FFT may be utilized to convert the received tones from the time to the frequency domain. Examples of such equivalent devices include digital bandpass filters for each received tone.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A multi-tone modem with a plurality of components forming a transmit path and a receive path; and the receive path components of the multi-tone modem comprising:
   a fast Fourier transform (FFT) component to convert multiple received tones in a time domain to successive symbols in a frequency domain, with each of the successive symbols including pilot sub-symbols together with message sub-symbols;
   a message processor coupled to the FFT and the message processor operable to select pairs of message and pilot sub-symbols in each symbol and to equalize the message sub-symbol with the pilot sub-symbol in each pair of sub-symbols to substantially remove from the message sub-symbol frequency dependent phase shifts between the tones of each symbol; and the message processor including:
      a pseudo-equalizer for multiplying the message sub-symbol times the complex conjugate of the pilot sub-symbol in each pair of message and pilot sub-symbols to substantially remove from the message sub-symbol the frequency dependent phase shifts therein and;
   a decoder coupled to the message processor for decoding each message sub-symbol equalized in the act of equalizing to the corresponding message data.

2. A multi-tone modem with a plurality of components forming a transmit path and a receive path; and the receive path components of the multi-tone modem comprising:
- a fast Fourier transform (FFT) component to convert multiple received tones in a time domain to successive symbols in a frequency domain, with each of the successive symbols including pilot sub-symbols together with message sub-symbols;
- a message processor coupled to the FFT and the message processor operable to select pairs of message and pilot sub-symbols in each symbol and to equalize the message sub-symbol with the pilot sub-symbol in each pair of sub-symbols to substantially remove from the message sub-symbol frequency dependent phase shifts between the tones of each symbol; and the message processor including:
    - a de-scrambler for asymmetrically de-scrambling the message sub-symbols and the pilot sub-symbols with the asymmetrical de-scrambling resulting in each message sub-symbol and pilot sub-symbol exhibiting a fixed phase bias; and
- a decoder coupled to the message processor for decoding each message sub-symbol equalized in the act of equalizing to the corresponding message data, wherein the decoder further decodes each message symbol with a decoding table which removes the fixed phase bias imparted by the de-scrambler.

3. A multi-tone modem with a plurality of components forming a transmit path and a receive path; and the receive path components of the multi-tone modem comprising:
- a fast Fourier transform (FFT) component to convert multiple received tones in a time domain to successive symbols in a frequency domain, with each of the successive symbols including pilot sub-symbols together with message sub-symbols;
- a message processor coupled to the FFT and the message processor operable to select pairs of message and pilot sub-symbols in each symbol and to equalize the message sub-symbol with the pilot sub-symbol in each pair of sub-symbols to substantially remove from the message sub-symbol frequency dependent phase shifts between the tones of each symbol; and the message processor including:
    - a diversity combiner for combining selected ones of the equalized message sub-symbols redundant with respect to one another in terms of the message data encoded therein to produce at least one unique message sub-symbol with a reduced noise level therein; and
- a decoder coupled to the message processor for decoding each message sub-symbol equalized in the act of equalizing to the corresponding message data, wherein the decoder further decodes the at least one unique message sub-symbol to the corresponding message data.

4. A method for demodulating data received over a communication medium with a communication channel with multiple pilot tones with pilot data modulated thereon and message tones with message data modulated thereon, and the method for demodulating comprising:
- converting the received data from a time domain to a frequency domain with the received data in the frequency domain including successive symbols each including pilot sub-symbols together with message sub-symbols;
- selecting pairs of message and pilot sub-symbols in each symbol;
- equalizing the message sub-symbol with the pilot sub-symbol in each pair of sub-symbols to substantially remove from the message sub-symbol frequency dependent phase shifts imparted to the communication channel, including multiplying the message sub-symbol times the complex conjugate of the pilot sub-symbol in each pair selected in the act of selecting to substantially remove from the message sub-symbol the frequency dependent phase shifts therein; and
- decoding each message sub-symbol equalized in the act of equalizing to the corresponding message data.

5. A method for demodulating data received over a communication medium with a communication channel with multiple pilot tones with pilot data modulated thereon and message tones with message data modulated thereon; and the method for demodulating comprising:
- converting the received data from a time domain to a frequency domain with the received data in the frequency domain including successive symbols each including pilot sub-symbols together with message sub-symbols;
- asymmetrically de-scrambling the message sub-symbols and the pilot sub-symbols with the asymmetrical de-scrambling resulting in each message sub-symbol and pilot sub-symbol exhibiting a fixed phase bias;
- selecting pairs of message and pilot sub-symbols in each symbol;
- equalizing the message sub-symbol with the pilot sub-symbol in each pair of sub-symbols to substantially remove from the message sub-symbol frequency dependent phase shifts imparted to the communication channel, including multiplying the message sub-symbol times the complex conjugate of the pilot sub-symbol in each pair selected in the act of selecting to substantially remove from the message sub-symbol the frequency dependent phase shifts therein; and
- decoding each message sub-symbol equalized in the act of equalizing to the corresponding message data including decoding each message symbol with a decoding table which removes the fixed phase bias imparted in the asymmetrical de-scrambling act.

6. A method for demodulating data received over a communication medium with a communication channel with multiple pilot tones with pilot data modulated thereon and message tones with message data modulated thereon; and the method for demodulating comprising:
- converting the received data from a time domain to a frequency domain with the received data in the frequency domain including successive symbols each including pilot sub-symbols together with message sub-symbols;
- selecting pairs of message and pilot sub-symbols in each symbol;
- equalizing the message sub-symbol with the pilot sub-symbol in each pair of sub-symbols to substantially remove from the message sub-symbol frequency dependent phase shifts imparted to the communication channel;
- combining selected ones of the message sub-symbols equalized in the act of equalizing, with the selected ones of the message sub-symbols redundant with respect to one another in terms of the message data encoded therein to produce at least one unique message sub-symbol with a reduced noise level therein; and
- decoding each message sub-symbol equalized in the act of equalizing to the corresponding message data including decoding the at least one unique message sub-symbol to the corresponding message data.

7. A method of modem training between at least two modems comprising the steps performed at a receiving one of the at least two modems of:

converting a training set of pilot tones and message tones from a time domain to a frequency domain with the received data in the frequency domain including successive training symbols each including pilot sub-symbols together with message sub-symbols;

selecting pairs of message and pilot sub-symbols in each training symbol;

equalizing the message sub-symbol with the pilot sub-symbol in each pair of sub-symbols to substantially remove from the message sub-symbol frequency dependent phase shifts between the tones of each training set including multiplying the message sub-symbol times the complex conjugate of the pilot sub-symbol in each pair selected in the act of selecting to substantially remove from the message sub-symbol the frequency dependent phase shifts therein and;

decoding each message sub-symbol equalized in the act of equalizing to the corresponding message data.

8. A method of modem training between at least two modems comprising the steps performed at a receiving one of the at least two modems of:

converting a training set of pilot tones and message tones from a time domain to a frequency domain with the received data in the frequency domain including successive training symbols each including pilot sub-symbols together with message sub-symbols;

asymmetrically de-scrambling the message sub-symbols and the pilot sub-symbols with the asymmetrical de-scrambling resulting in each message sub-symbol and pilot sub-symbol exhibiting a fixed phase bias;

selecting pairs of message and pilot sub-symbols in each training symbol;

equalizing the message sub-symbol with the pilot sub-symbol in each pair of sub-symbols to substantially remove from the message sub-symbol frequency dependent phase shifts between the tones of each training set; and decoding each message sub-symbol equalized in the act of equalizing to the corresponding message data including decoding each message symbol with a decoding table which removes the fixed phase bias imparted in the asymmetrical de-scrambling act.

9. A method of modem training between at least two modems comprising the steps performed at a receiving one of the at least two modems of:

converting a training set of pilot tones and message tones from a time domain to a frequency domain with the received data in the frequency domain including successive training symbols each including pilot sub-symbols together with message sub-symbols;

selecting pairs of message and pilot sub-symbols in each training symbol; equalizing the message sub-symbol with the pilot sub-symbol in each pair of sub-symbols to substantially remove from the message sub-symbol frequency dependent phase shifts between the tones of each training set;

combining selected ones of the message sub-symbols equalized in the act of equalizing, with the selected ones of the message sub-symbols redundant with respect to one another in terms of the message data encoded therein to produce at least one unique message sub-symbol with a reduced noise level therein; and decoding each message sub-symbol equalized in the act of equalizing to the corresponding message data including decoding the at least one unique message sub-symbol to the corresponding message data.

* * * * *